US006735388B2

(12) United States Patent
Smart

(10) Patent No.: US 6,735,388 B2
(45) Date of Patent: May 11, 2004

(54) CAMERA HAVING TRANSVERSE OPTICAL ENCODER

(75) Inventor: David C. Smart, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/269,322

(22) Filed: Oct. 11, 2002

(65) Prior Publication Data
US 2004/0071464 A1 Apr. 15, 2004

(51) Int. Cl.[7] ................................. G03B 17/24
(52) U.S. Cl. ................. 396/316; 396/340; 396/355; 396/429; 396/435; 396/530; 396/544
(58) Field of Search .................... 396/71, 73, 315, 396/316, 340, 355, 381, 429, 435, 439, 530, 544

(56) References Cited

U.S. PATENT DOCUMENTS 4,586,802 A  *  5/1986  Nagano et al. ............. 396/544
5,587,752 A     12/1996 Petruchik .................... 396/315
5,740,479 A      4/1998 Soma et al. ................. 396/315
5,761,558 A      6/1998 Patton et al. ................ 396/429
6,081,675 A  *   6/2000 Mogamiya et al. ......... 396/429
6,285,834 B1 *   9/2001 Hylen ......................... 396/544
6,332,059 B1    12/2001 Kamata et al. ............. 396/311

FOREIGN PATENT DOCUMENTS

JP    54-26721    2/1979
JP    4328537    11/1992

* cited by examiner

Primary Examiner—D. Rutledge
(74) Attorney, Agent, or Firm—Robert Luke Walker

(57) ABSTRACT

A camera has a body having an exposure frame surrounding an exposure opening. The exposure frame has a window. A mask core is mounted in the body. The mask core has an axis of rotation extending transverse to the exposure frame. The mask core has a plurality of sectors arranged about the axis of rotation. Each sector has an active position adjoining the window. Each sector shades the window differently in the respective active position. A drive is coupled to the mask core. The drive selectively rotates the mask core between the active positions of each of the sectors.

26 Claims, 13 Drawing Sheets

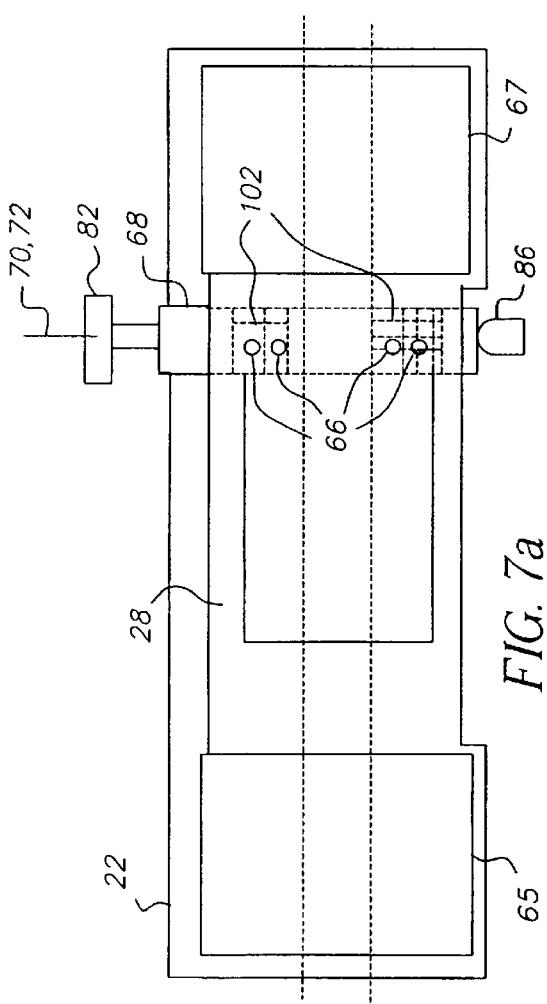
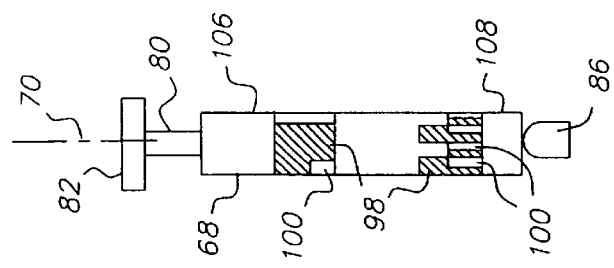
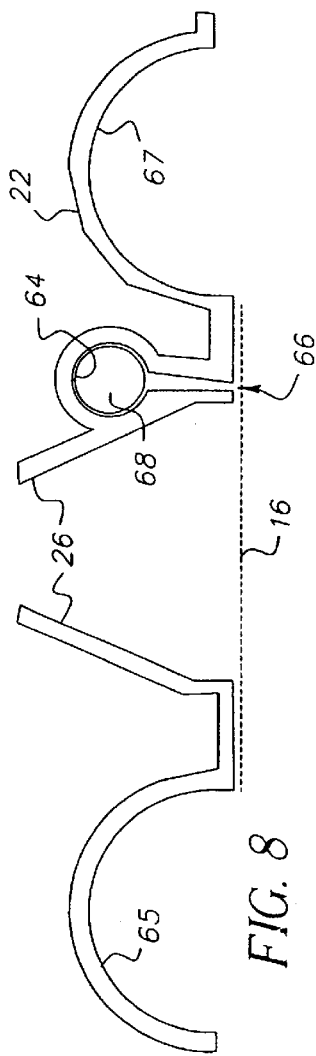

CAMERA HAVING TRANSVERSE OPTICAL ENCODER

CROSS REFERENCE TO RELATED APPLICATIONS

Reference is made to commonly assigned, co-pending U.S. patent application Ser. No. 10/269,598, entitled: PHOTOGRAPHY SYSTEMS AND METHODS UTILIZING FILTER-ENCODED IMAGES, filed Oct. 11, 2002, in the names of Joel S. Lawther, Anthony DiRisio, David C. Smart, Edward B. Gindele; Ser. No. 10/269,715, entitled: CAMERAS, METHODS, AND SYSTEMS WITH PARTIAL-SHADING ENCODEMENTS, filed Oct. 11, 2002 in the names of David C. Smart, Anthony DiRisio, Joel S. Lawther, Robert Luke Walker, Edward B. Gindele, David A. Hodder; Ser. No. 10/269,321, entitled: CAMERA HAVING ROTARY OPTICAL ENCODER, filed Oct. 11, 2002 in the names of David C. Smart, Craig A. Baker; Ser. No. 10/269,622, entitled: METHODS, APPARATUS, AND SYSTEMS FOR DETECTING PARTIAL-SHADING ENCODEMENT FILTERING, filed Oct. 11, 2002 in the names of Edward B. Gindele Joel S. Lawther, David C. Smart.

FIELD OF THE INVENTION

The invention relates to photography and photographic equipment and methods and more particularly relates to a camera having a transverse optical encoder.

BACKGROUND OF THE INVENTION

Optically recorded encodements on photographic filmstrips have long been used to control printing and other functions. U.S. Pat. No. 5,740,479 describes optical encodements and indicates that it is known to use reflected light from the photographic subject or a light directly from a camera light source to provide the illumination for recording the optical encodement. This patent also notes that the use of ambient lighting to write the encodement is subject to the shortcoming that the recorded information can be difficult to distinguish under some lighting conditions.

It is known to prerecord encodements on film before a one-time-use camera is assembled. It is also known to record encodements for selected image frames based upon a camera condition at the time of picture taking. U.S. Pat. No. 6,332,059 combines both practices. A first encodement is prerecorded on the film before assembly and a second encodement is added to selected film frames based on the position of a selection switch. An encodement that applies to all of the images in a film unit can be recorded so as to apply to all frames, rather than being repeated. U.S. Pat. No. 5,761,558 discloses the recording of extensive information on the outside of a film unit in a visible bar code.

Encodements can be placed in various positions. U.S. Pat. No. 6,332,059 discloses placement of optical encodements at film margins adjoining film frames. U.S. Pat. No. 5,587,752 discloses placement of optical encodements laterally next to an image, either within or next to a respective film frame. Japanese patent publication JP 4-328537, published Nov. 17, 1992, discloses a one-time-use camera having a pair of slidable viewfinder masks that move in tandem with a pair of code signal plates for pseudo panoramic and pseudo telephoto final image formats. The code signal plates mask part of the exposure opening when a respective viewfinder mask is in position in the viewfinder. One of the code signal plates is illustrated as having one slot. The other is shown as having two slots. (Image subject matter is visible through the slots.) The final images crop out the patterns made by the code signal plates.

It is well known to use optical encodements on filmstrips to provide photofinishing instructions. JP 54-26721 discloses a camera having a rotating disk. The disk has three different patterns in different positions about a central axis. The patterns are one hole, two holes, and three holes. The disk is rotated for a particular encodements and the light from a light source shines through to expose the encodement onto the film. The use of viewfinder encoders to show the effects of pseudo zoom are also disclosed.

Many currently available digital photofinishing systems scan film images, but do not scan film margins.

It would thus be desirable to provide an improved camera and method, in which an encodement can be recorded between film frames, simply and easily.

SUMMARY OF THE INVENTION

The invention is defined by the claims. The invention, in broader aspects, provides a camera that has a body having an exposure frame surrounding an exposure opening. The exposure frame has a window. A mask core is mounted in the body. The mask core has an axis of rotation extending transverse to the exposure frame. The mask core has a plurality of sectors arranged about the axis of rotation. Each sector has an active position adjoining the window. Each sector shades the window differently in the respective active position. A drive is coupled to the mask core. The drive selectively rotates the mask core between the active positions of each of the sectors.

It is an advantageous effect of the invention that an improved camera and method, in which an encodement can be recorded between film frames, simply and easily.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 7a is a semi-diagrammatical rear view of another embodiment of the camera.

FIG. 7b is the same view as FIG. 7a of the mask core of the camera of FIG. 7a.

FIG. 8 is a cross-sectional view of the frame and mask core of the camera of FIG. 7. The position of a segment of photographic film is indicated by a dashed line.

DETAILED DESCRIPTION OF THE INVENTION

Figure 4:
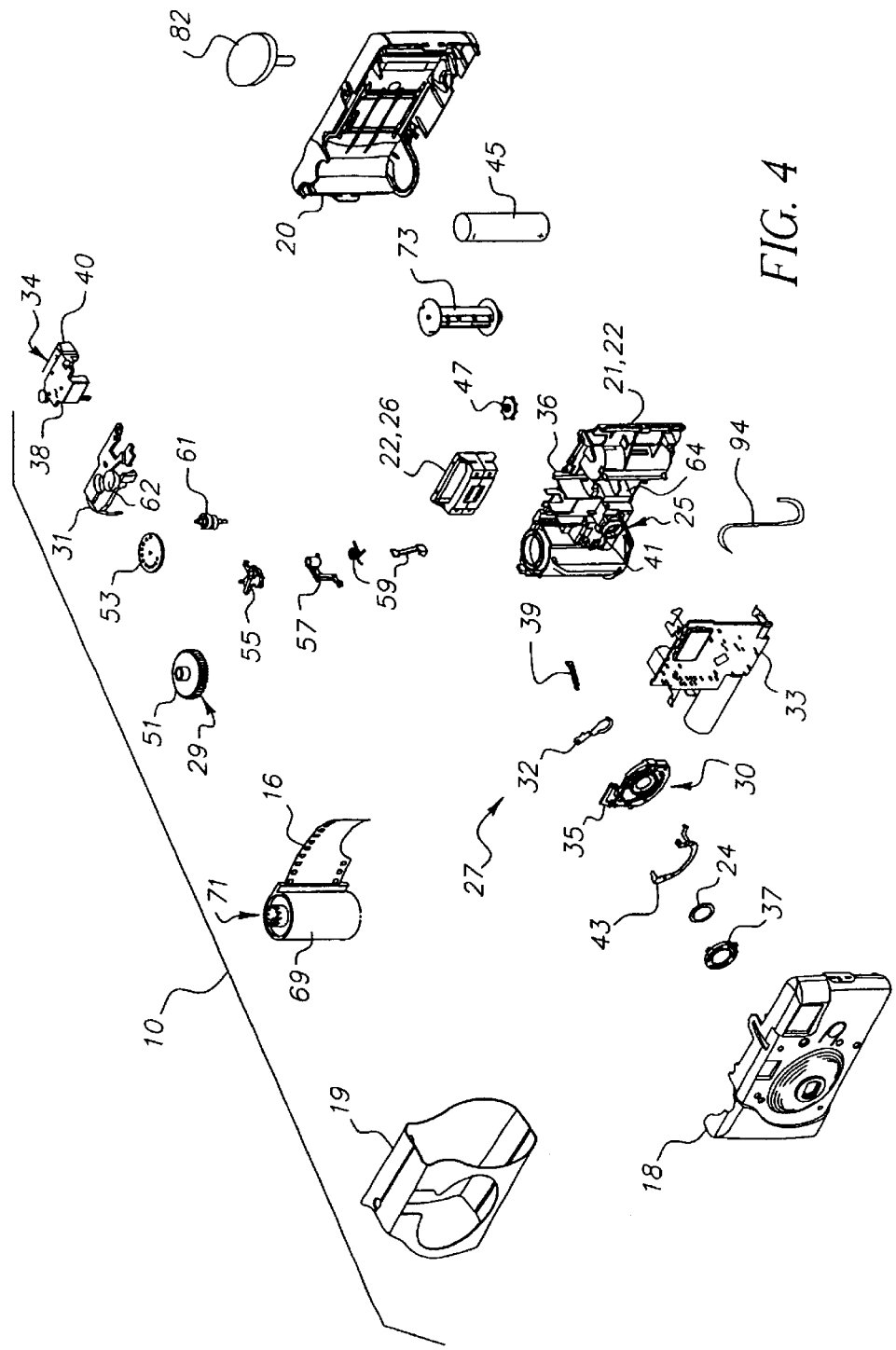
FIG. 4 is an exploded, front perspective view of the camera of FIG. 3.

The camera 10 has a body 12 that holds an exposure system or capture unit, which captures light images on photographic film 16. The body 12 provides structural support to other components. The body 12 has a shell 14 having a front cover 18 and a rear cover 20. The covers 18,20 are joined together and a label 19 (shown in FIG. 4) is adhered over the covers 18,20. A baffled-frame 22 held between the covers 18,20. Most camera components are attached to the baffled-frame 22 or trapped between the baffled-frame 22 and covers 18,20. The baffled-frame 22 has a camera-frame 21 and a baffle 26 joined to the camera-frame 21.

The exposure system includes a taking lens and shutter assembly 27, a film transport 29, a keeper plate 31, a viewfinder 34, and a flash unit 33. Features of the exposure system are only briefly discussed here, since such components are well known to those of skill in the art.

The taking lens and shutter assembly 27 includes a shutter 32, a taking lens 24, and support members 35,37. The taking lens 24 directs light through an aperture 25 and then a baffle 26 to an exposure frame 28. The taking lens 24 includes one or more lens elements, which define an optical axis 84. The rear support member 35 holds the shutter 32 and one or more shutter biasing springs 39 against a mount portion 41 of the baffled-frame 22. The front support member 37 holds the taking lens 24 against the rear support member 35. The flash unit 33 adjoins the shutter assembly 27 and has a flash contact 43 that is touched by the shutter 32 during image capture. The shutter blade 32 is electrically conductive. A battery 45 is joined to the flash unit 33 to provide power.

The film transport 29 includes a sprocket wheel 47 for engaging film perforations, a multiple piece metering-charging assembly, and a film advance 51 that is operated by the user to supply rotary motion to the film transport 29. A counter-wheel 53, also present, is driven by the metering-charging assembly. The metering-charging assembly includes metering and high energy levers 55,57, one or more biasing springs 59, and a rotary multiple level cam unit 61 that engages and operates the sprocket wheel 47. The keeper plate 31 has an integral shutter release 62 that, through the metering assembly, releases the shutter 32 for picture exposure.

A viewfinder 34 is disposed in the body 12 and is registered with the taking lens 24 so as to show substantially the same scene image. The viewfinder 34 has a tunnel 36 that is part of the baffled-frame 22 and front and rear viewfinder lenses 38,40.

The baffled-frame 22 includes a film holder 63, which has first and second film chambers 65,67, and an exposure frame 28 between the chambers 65,67. The canister 69 of a film unit 71 rests in the second chamber 67, while a spool 73 rests in the first chamber 65. An end of the filmstrip 16 of the film unit 71 is attached to the spool 73 in the canister (this is not shown). The filmstrip 16 extends along the exposure frame 28, between the chambers 65,67.

The exposure frame 28 is rectangular and holds a frame 42 of film and an interspace 44 (the short segment between adjacent film frames 42). The exposure frame 28 has an edge 46 that surrounds a rectangular exposure opening 48. The exposure frame includes a pair of opposed upper and lower portions 28a and a pair of opposed lateral portions 28b.

The filmstrip 16 is advanced through the exposure frame 28 on a frame-by-frame basis for each image capture. In the one-time-use camera 10 shown, the filmstrip 16 is prewound out of a film canister 52 into a film roll (not shown) during camera assembly. The filmstrip 16 is advanced by the film transport 29. The counterwheel 53 has indicia (not illustrated) to indicate film usage. The shutter 32 is charged by the film transport 29. A shutter release 62 is tripped by the user to release the shutter 32 for image exposure.

The term "one-time use camera" and like terms are used herein to refer to cameras 10 that are provided to consumers in preloaded form and cannot be reloaded, by the consumer, without extensive camera disassembly, or replacement of parts, or use of special tools, or the like.

The baffled-frame 22 of the camera 10 has a passageway 64 that extends transverse, or preferably, perpendicular to the direction of travel of the filmstrip 16 and to the optical axis 84. The passageway 64 has a window 66 extending through the exposure frame 28 and a longitudinal axis 70 that is inset relative to the passageway 64. In particular embodiments, the window 66 is located lateral to the exposure opening 48 in a lateral portion 28b of the exposure frame 28. The passageway 64 can be continuous, except at the window 66, and closed at opposed ends or can be partially cut-away to reduce weight. For example, the passageway 64 can be limited, on one side, to one or more separated bands or a cup at each end or some combination of such features.

A mask core or encoder 68 is disposed within the passageway 64. The mask core 68 can rotate about its longitudinal axis 70, which is parallel to the longitudinal axis 70 of the core 68. To reduce required space, a relatively close fit can be provided between the mask core 68 and passageway 64 and the mask core axis 70 can be coincident with the passageway axis 72.

When the user takes a picture, the mask core 68 modulates light from a light source exposing an encodement pattern 74 onto the film 16, in association with the respective film frame 42. It is preferred that the encodement pattern 74 is associated with an adjoining film frame 42, since this reduces the chances of separation, if a filmstrip is cut into segments. The specific association of film frame 42 and encodement pattern 74 (upstream or downstream) can be predetermined or could be indicated by a particular encodement pattern or in some other manner.

The mask core 68 is rotated to provide different encodement patterns 74. The encodement patterns 74 differ in position on the exposure frame 28 or in color or in configuration or in some combination of these features. For an individual mask core 68, all encodement patterns are exposed at the same position in the exposure frame 28. With uniform frame-by-frame film transport, encodement patterns 74 are exposed on each film segment, in an unchanging relationship to the respective film frame 42. The encodement patterns 74 can overlap a respective film frame 42, but this degrades image content. It is preferred that the encodement patterns 74 be located in the interspaces 44 between film frames 42.

The mask core 68 can be rotated to provide a set of encodement patterns 74 that differ in rotational position relative to the axis of rotation 70 of the mask core 68. Different encodement patterns 74 can be detected, following film development, during photofinishing. Each encodement pattern 74 can be associated with a different fulfillment option, such as numbers and types of prints or other final images, digital image modifications and the like. A user can change the encodement pattern 74 from frame to frame, as desired, within the set of available encodement patterns 74 of a particular mask core 68. The encodement pattern 74 associated with a particular film frame 42 can indicate a fulfillment option for that particular film frame or can indicate an option for a group of film frames or the entire film unit. In the latter case, an encodement pattern 74 can be exposed onto the film only when an option was changed or only once per film unit. Mask cores 68 in different cameras 10 can also differ. This difference can be used to convey information, such as camera type or which set of multiple sets of fulfillment options are to be provided at photofinishing.

Figure 3:
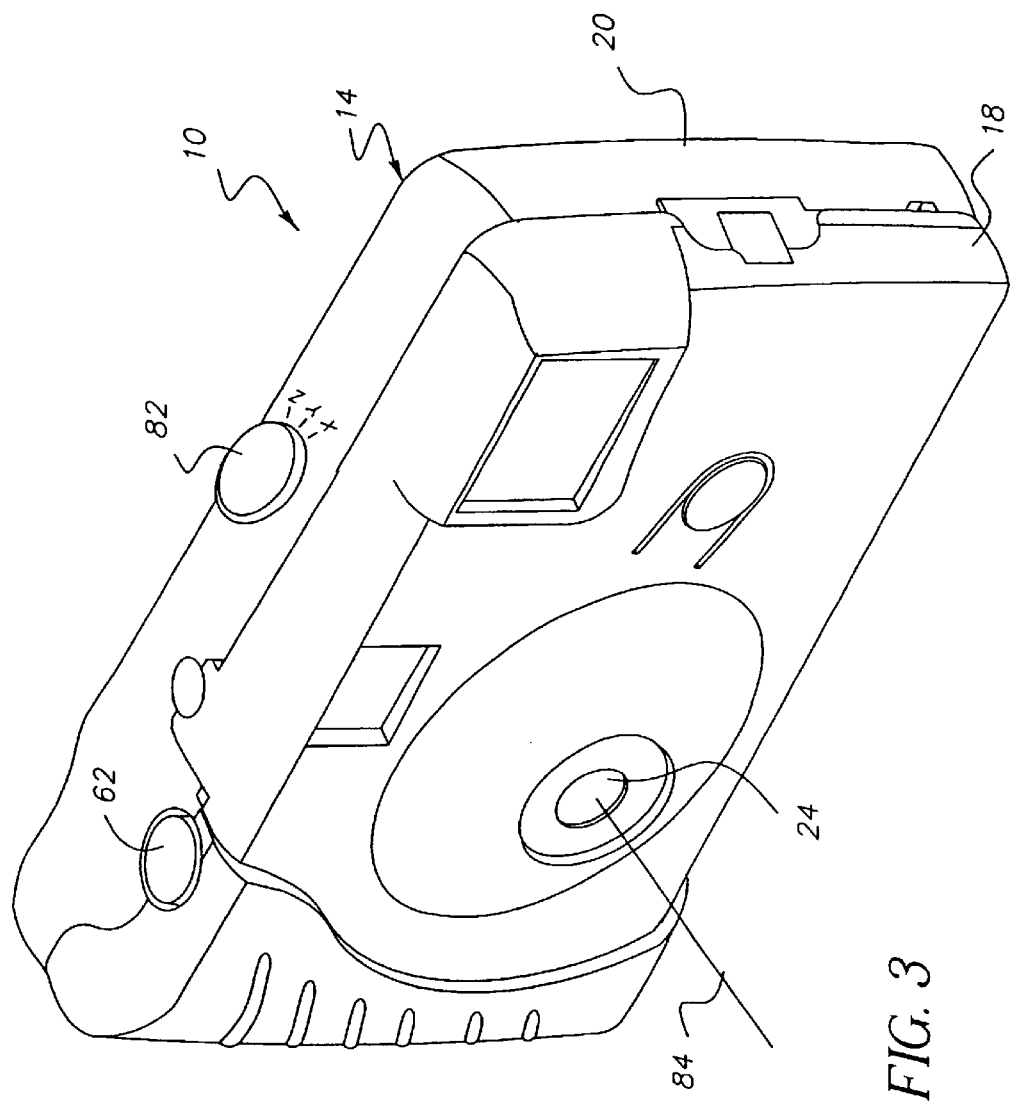
FIG. 3 is a perspective view of the camera of FIG. 1. The body shape is modified from FIG. 1.

A mask drive 78 is connected to the mask core 68. In the embodiment shown in FIG. 1 the mask drive 78 is manual. A shaft 80 extends from the mask core 68 through the body 12 to a knob 82. The knob is rotated by the user to a desired position. The camera body can bear indicia 82a (shown in FIG. 3) to help the user ascertain the available positions. The indicia 82a can indicate available digital modifications (represented in FIG. 3 by "x", "y", "z") that will be provided by expected photofinishing. A train (not shown) of gears or friction wheels can be provided between the shaft 80 and the mask core 68.

The mask drive 78 can be powered by an electric motor 123. The user can operate the mask drive 78 through a switch or a user control connected to the motor 121 through a programmable computer 90 within the camera 10. Positioning of an electrically driven mask core 68 can be provided in the same manner as in the positioning of zoom lenses. For example, a stepper motor can be used, or, alternatively, feedback can be used to indicate when a particular position is reached. A friction disk or gear coupled to the mask core can have a code plate (not illustrated) or the like to provide the feedback.

Figure 2:
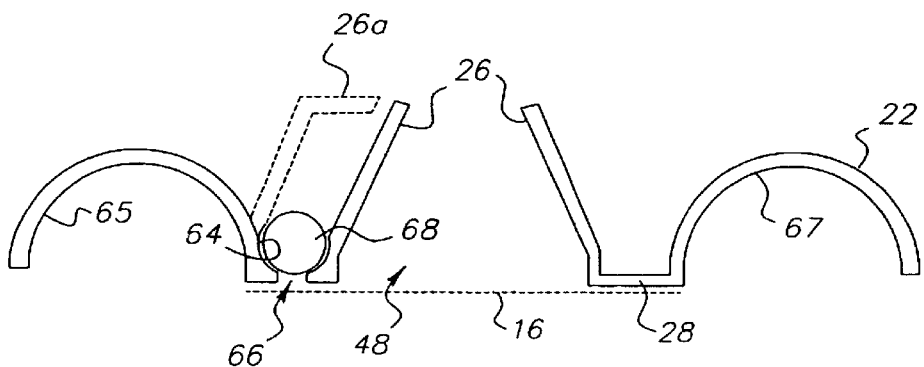
FIG. 2 is a cross-sectional view of the frame and mask core of the camera of FIG. 1. The position of a segment of photographic film is indicated by a dashed line. Some dimensions are exaggerated for clarity.

The light source can be scene lighting. FIG. 2 shows, in dashed lines part of a modified baffle 26a that transmits light from the scene, at the time of exposure, to both the exposure opening 48 and to a front facing portion of the mask core 68. The camera can be further modified to provide a dedicated light path and shutter (not shown).

It is preferred that the light source exposing all encodement patterns 74 be at a constant intensity. For this reason, the use of an internal light source, such as a lamp 86 or light from the flash unit 33 is preferred over use of scene illumination. FIG. 2 shows, in solid lines, a baffle 26 that limits scene lighting to the exposure opening 48. The forward facing portion of the mask core 68 is protected by light-locking features of the body (not shown).

A convenient lamp 86 is a light emitting diode or small tungsten lamp. Illumination of the light emitting diode or other lamp 86 occurs with each exposure. Circuits that flash strobes at every exposure are very well known to those of skill in the art and are readily modified to light a light emitting diode at the same time. In a simple case, the LED or other lamp 86 can be provided as part of the flash unit 33 of the camera 10 and the flash unit 33 and lamp 86 are fired with every exposure. In the embodiment shown in FIG. 4, two flash synch contacts are immobile and the shutter 32 is conductive and acts as a moving contact to bridge the immobile contacts during exposure. Other configurations of flash synch contacts, such as one fixed contact and one movable contact, are well known to those of skill in the art.

Figure 18:
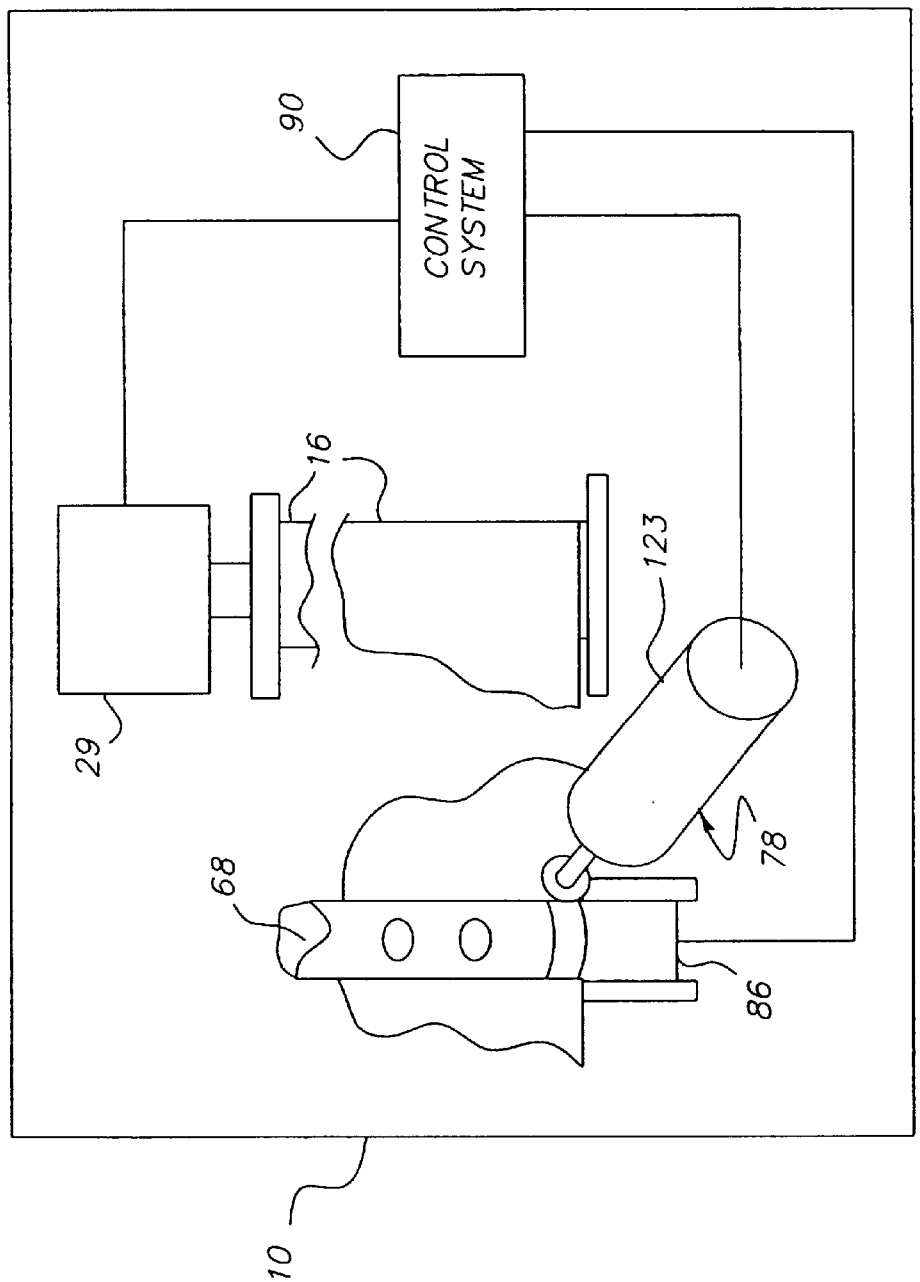
FIG. 18 is a semi-diagrammatical view of the encoder assembly and related camera features of another embodiment of the camera.

A lamp 86 circuit that is independent of the flash unit 33 can be operated by synch contacts like those used for flash units. Such synch contacts are well known to those of skill in the art. Lighten duration can be the same for each exposure and can be determined by a timer circuit or can be provided as a clock function of a camera microprocessor or other computing device of a camera control system 90 (shown in FIG. 18). For example, a powered circuit including the light emitting diode can be momentarily closed by the flash synch contacts when the user takes a picture, causing the light emitting diode to light. The light on duration can also by controlled by the camera shutter 32, if the shutter 32 is limited to exposures of sufficient duration for appropriate operation of the lamp 86.

A light pipe 94 (shown in FIG. 1 by dashed lines) transmitting light from the flash-tube-reflector assembly 96 can be used in the same manner as a separate lamp 86.

The mask core 68 has one or more light shading portions 98 and, preferably has one or more light transmitting portions 100. The light shading and light transmitting portions 98,100 are aligned, in an axial direction, with the window 66. Each shading portion 98 shades, that is, attenuates, the light from the light source. The shading can be complete (also referred to herein as "shadowing") or the shading can be filtering. Each light transmitting portion 100 transmits light and can, optionally, also filter that light. The shading portions 98 partially or fully block light. The transmitting portions 100 partially or fully transmit light. Partial transmission and partial blocking both refer to filtering. Adjoining light transmitting and light shading portions 100,98 can both filter light, but if so, the two portions 98,100 then filter differently. For example, a light transmitting portion 100 can be a green filter and an adjoining light shading portion 98 can be a red filter.

It is currently preferred that the mask core 68 has one or more light shading portions 98 alternating with one or more light transmitting portions 100. An alternative is to replace a light-transmitting portion 100 with an empty space. This leaves the mask core 68 with limited physical support, and is therefore not preferred.

Figure 12A:
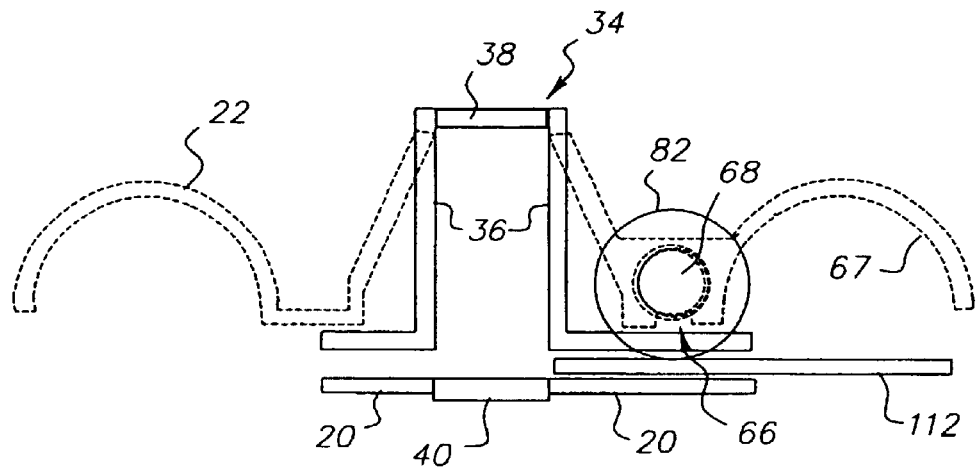
FIG. 12a is a cross-sectional view of the camera of FIGS. 9–11.
Figure 12B:
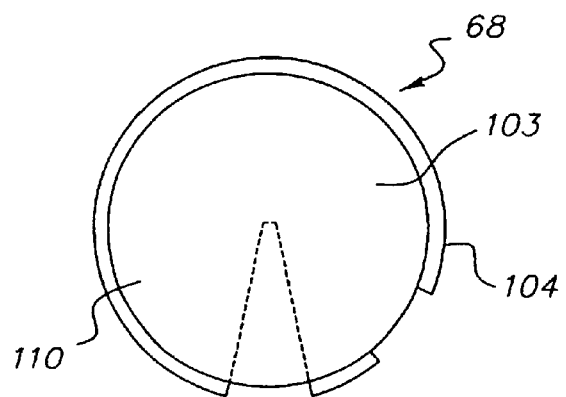
FIG. 12b is a cross-sectional view of a modification of the mask core of FIG. 7b.
Figure 13:
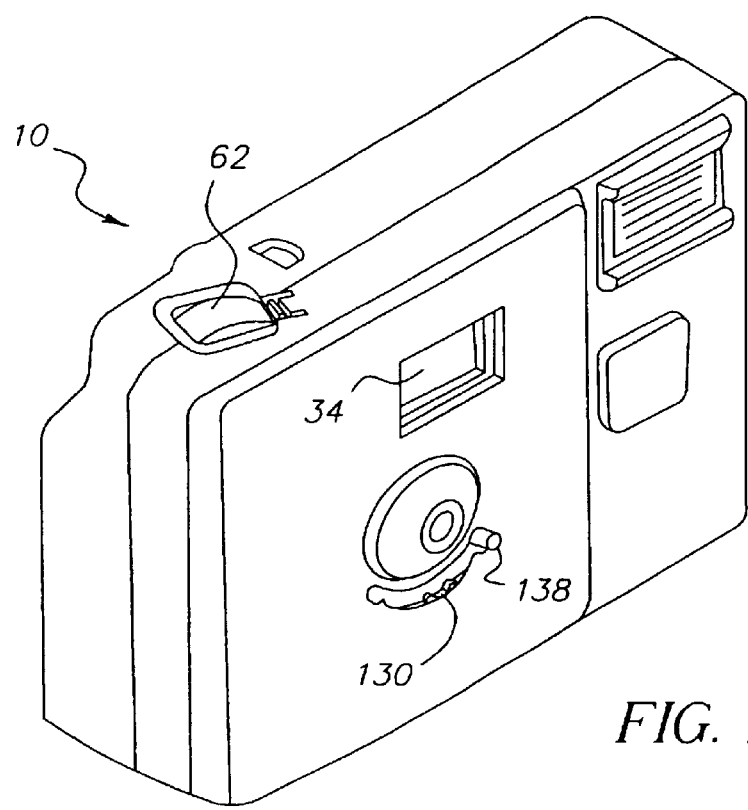
FIG. 13 is a front perspective view of another embodiment of the camera.
Figure 14:
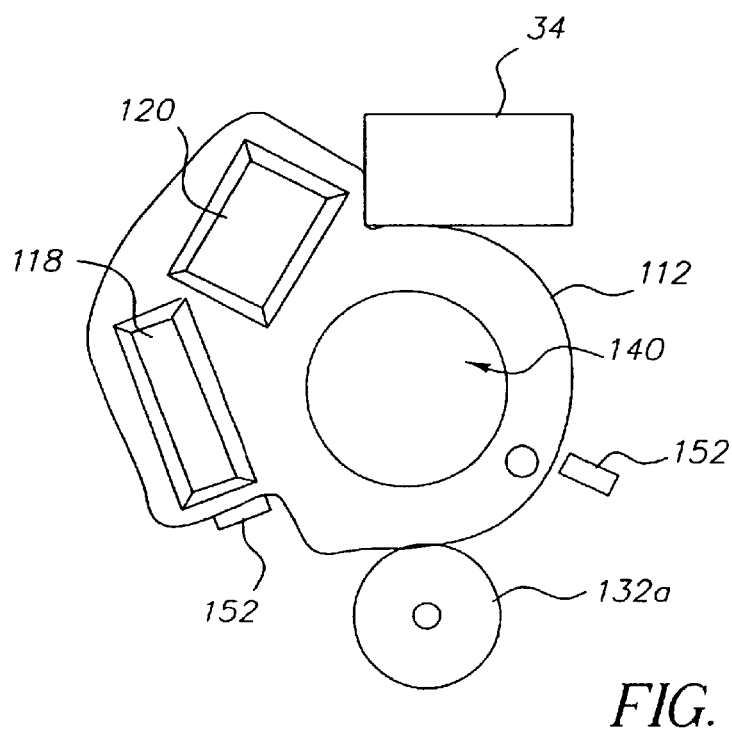
FIGS. 14–16 are front views of a viewfinder mask of the camera of FIG. 13 in orientations corresponding to three different positions of the encoder. Also shown are a gear of the geartrain, a pair of stops, and (in dashed lines) the location of the viewfinder lens unit.
Figure 15:
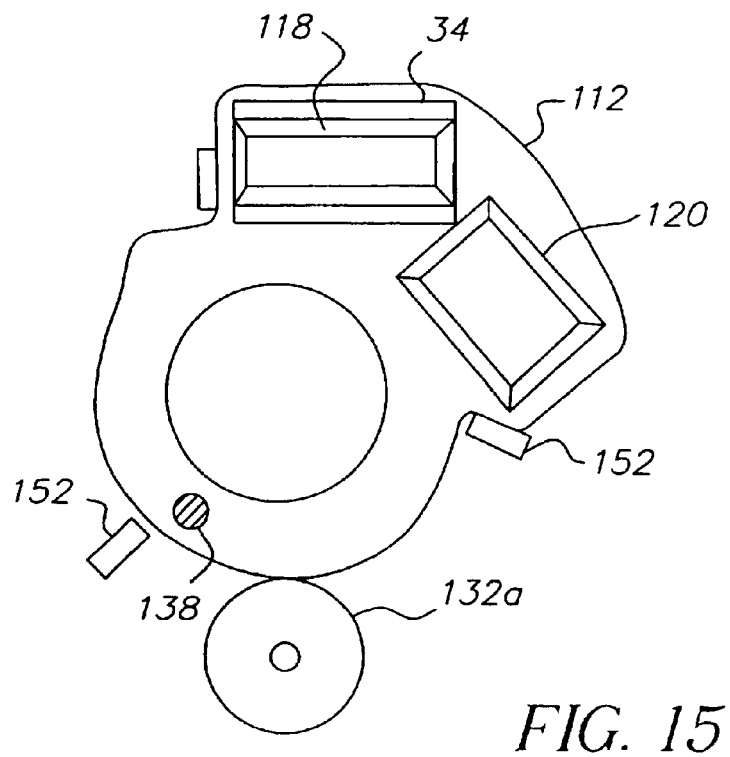
Figure 16:
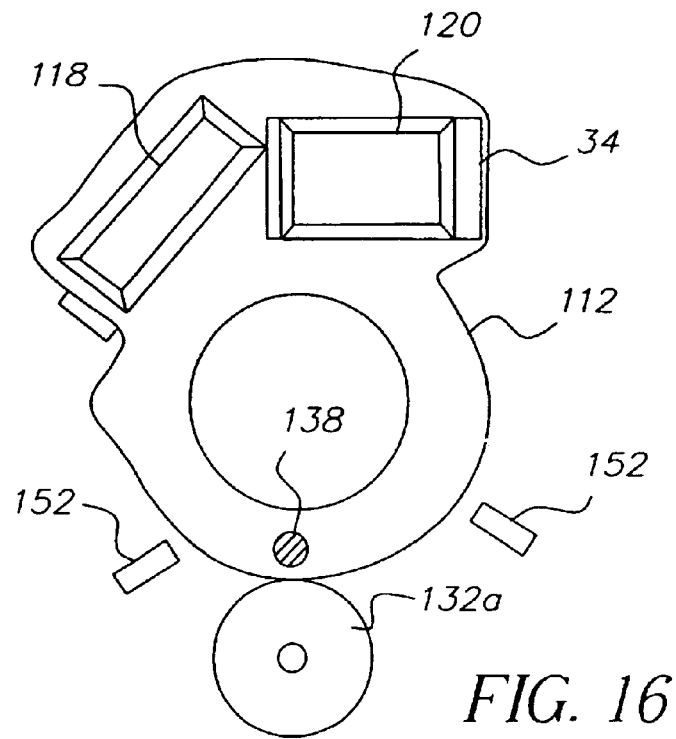
Figure 17:
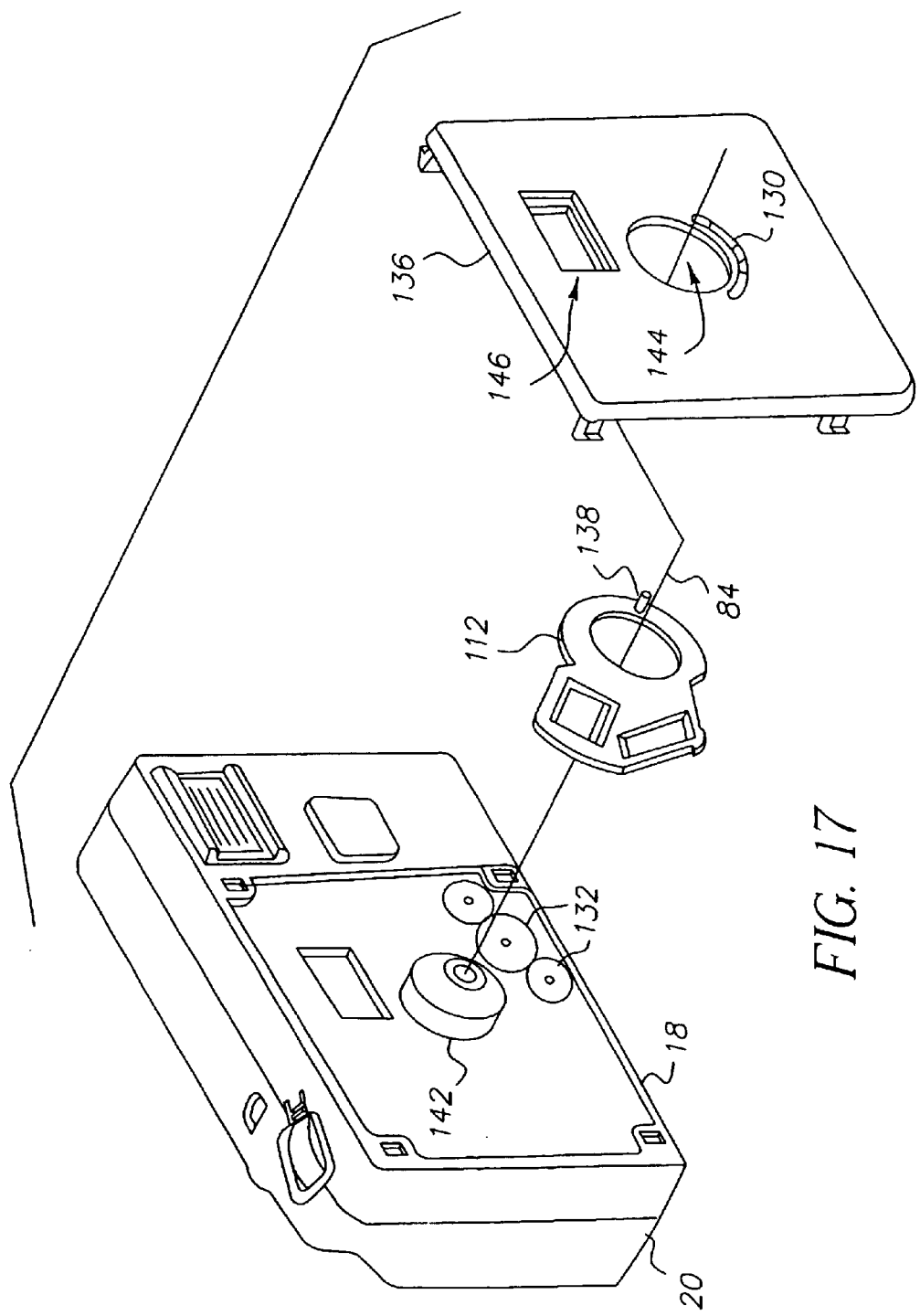
FIG. 17 is a partially exploded perspective view of the camera of FIG. 13. Positions of a geartrain and connecting shaft are indicated by dashed lines.

It is currently preferred that the mask core 68 has a constant cylindrical shape from end-to-end. In this case, the mask core 68 is in the form of a continuous hollow or solid cylindrical support 103. The light transmitting portion 100 and light-shading portion 98 are differentiated regions of the cylinder. The different shading and/or filtering effects of the different portions 98,100 can be provided throughout the bulk of the mask core 68, by use of different materials or modification of an initially uniform material. This approach is, however, relatively complex. It is currently preferred to divide the mask core 68 into light transmitting and light shading portions 100,98 only at the surface of a uniform cylindrical support. This is shown in FIG. 12b. A layer 104 overlaying the support 103, modifies the optical properties of the support 103 resulting in portions 98,100. The layer 104 could be on an inner surface of a hollow support, but is more convenient as a covering on the outer surface of the support 103. For example, a label or paint can be applied to the outer surface of a uniformly light transmissive support to provide the division into light transmitting and light shading portions 98. The layer 104 can be uniform (as in a coating of paint) or can two or more sublayers (as in a label having a support bearing a coating of adhesive). The layer 104 can be limited to light shading portions 98 or, with appropriate choice of light transmission properties of the layer 104, can include light shading and light transmitting portions 98,100. The layer 104 can also cover ends 106,108 of the core mask 68 that are axially offset from the window 66. This reduces stray light within the camera 10.

The mask core 68 can be diffusely lighted from an end 106,108 or from the front, opposite the window 66, or from internal illumination. The mask core 68 can also act as a light pipe 94 transmitting light longitudinally from a source. The light can be propagated outward by appropriately positioned scratches or other reflecting features.

Light shading and light transmitting portions 98,100 are different in different sectors 110 of the mask core 68. (A sector 110 is the minimum division of mask core 68 that carries a particular encodement value. The angular size of a sector is a function of the precision of the mask drive 78.) The mask core 68 is turned to place a selected sector 10 in an active position adjoining the window 66, to provide the encodement pattern 74 for a desired effect.

Figure 5:
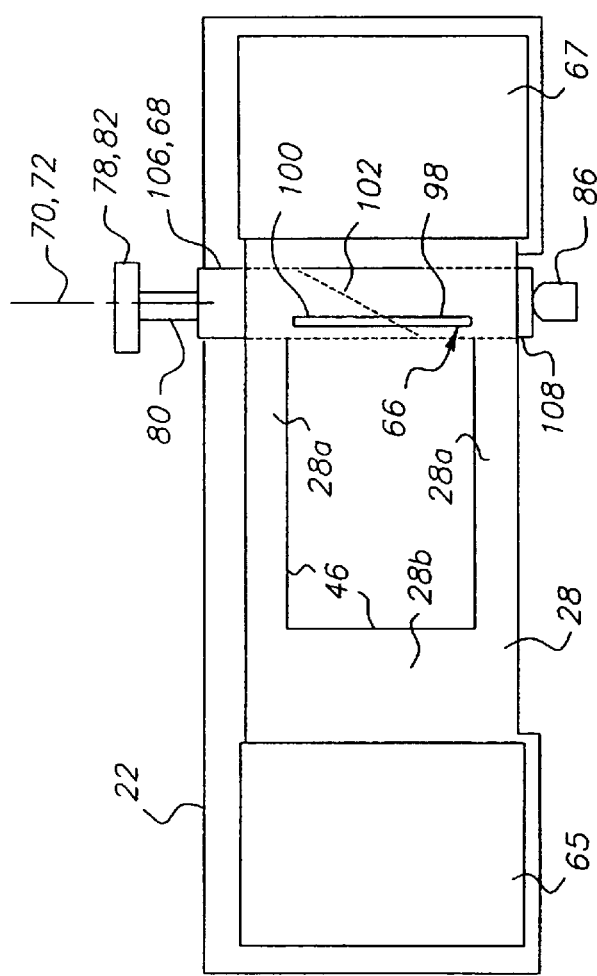
FIG. 5 is a semi-diagrammatical rear view of another embodiment of the camera.

The light shading and light transmitting portions 100 are divided by a boundary 102 (indicated by dashed lines in FIGS. 5 and 7a). The boundary 102 can be helical or can vary stepwise from one end to the other or can vary in accordance with different values of a particular code scheme. In FIG. 5, a helical mask boundary 102 is provided by a shading portion 98 that has an angled edge 46 that spirals around the support. The boundary 102 can also vary from segment 101 to segment 101 in a non-uniform manner. For example, a particular code scheme may have a continuous range of values, but only a limited selection of those values are available on a particular mask core 68.

The window 66 of the passageway 64 can be in the form of a continuous slot or a series of smaller separated holes. In both cases, the window 66 has a longitudinal dimension that extends transverse to the direction of travel of the filmstrip 16. (In the embodiments shown in the figures the longitudinal dimension of the window 66 is also transverse to an imaginary line parallel to the major dimension of the exposure opening 48.) It is preferred, to save space on the filmstrip 16 that the encodement patterns 74 are each limited to a single interspace 44 between adjoining film frames 42. It is convenient, for this purpose that the longest dimension of the window 66 be aligned with the longest dimension of the interspaces 44 between adjoining film frames 42.

Figure 6:
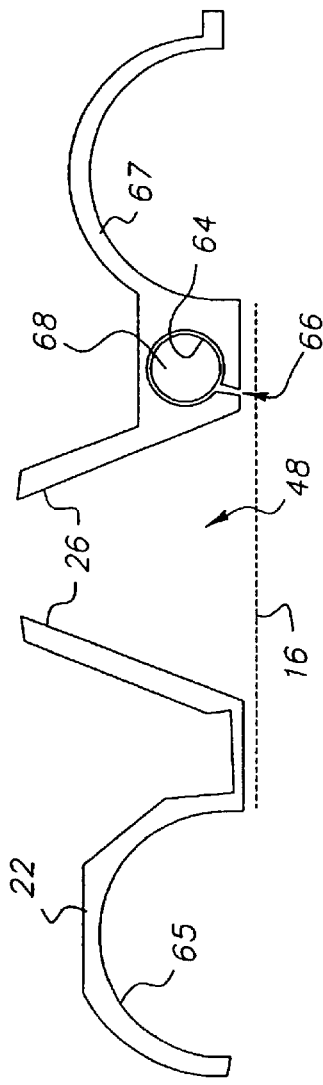
FIG. 6 is a cross-sectional view of the frame and mask core of the camera of FIG. 5. The position of a segment of photographic film is indicated by a dashed line.

The width of the window 66 in a direction parallel to the direction of film travel is largely a matter of convenience, as is the positioning of the window 66 relative to the exposure opening 48. The figures generally show a wide window 66 positioned for a wide interspace. This is for explanatory purposes. More narrow dimensions may be desirable. See, for example, FIGS. 5–6. Excessive width or positioning near a film frame 42 can result in image degradation, either directly or as a result of light scattering. The width is such that significant features of the encodement pattern 74 are all wider than the interspace 44 between pixels of an expected scanner. (A feature is significant, if the presence or absence of that feature conveys information.)

A slot shaped window 66 can be used with a mask core 68 having a helical boundary 102 to provide analog data. In practical use, the availability of a large number of mask core 68 positions with analog data may be offset by the difficulty of positioning the mask core 68 accurately relative to the window 66.

The window 66 can, alternatively, be divided into a line of holes. This approach limits the number of different encodement values available, but has the advantage of providing a high contrast background around each dot of the encodement pattern 74. A further advantage is that the holes can be positioned non-uniformly across the exposure frame 28. For example, a middle area (indicated by dashed lines) of the film frame 42 can be avoided. This approach takes into account the edge detecting systems used by many currently available digital photofinishing systems. These systems detect an edge of a film frame 42 at the middle area, and provide further processing, such as scanning, printing, and cutting; based upon that detected edge. A window 66 in the form of a line of holes can be interrupted and holes can be sized, as necessary to avoid the possibility of erroneous edge detection.

FIGS. 5 and 7a–7b illustrate different mask cores 68. In FIG. 5, the encodement patterns are provided by an exposed bar that has a boundary 102 that moves vertically up or down as the mask core is turned. In FIGS. 7a–7b, an encodement pattern is formed as a pattern of dots. Information can be conveyed by the encodement pattern on the basis or color or location or both.

TABLE 1

| Tube mask sector | dot 1 | dot 2 | dot 3 | dot 4 |
|---|---|---|---|---|
| 0 | | | | |
| 1 | | | | X |
| 2 | | | X | |
| 3 | | | X | X |
| 4 | | X | | |
| 5 | | X | | X |
| 6 | | X | X | |
| 7 | | X | X | X |
| 8 | X | | | |
| 9 | X | | | X |
| 10 | X | | X | |
| 11 | X | | X | X |
| 12 | X | X | | |
| 13 | X | X | | X |
| 14 | X | X | X | |
| 15 | X | X | X | X |

TABLE 2

| Tube mask sector | dot 1 | dot 2 |
|---|---|---|
| 0 | yellow | yellow |
| 1 | yellow | blue |
| 2 | yellow | red |
| 3 | yellow | green |
| 4 | blue | yellow |
| 5 | blue | blue |
| 6 | blue | red |
| 7 | blue | green |
| 8 | red | yellow |
| 9 | red | blue |
| 10 | red | red |
| 11 | red | green |
| 12 | green | yellow |
| 13 | green | blue |
| 14 | green | red |
| 15 | green | green |

Figure 1:
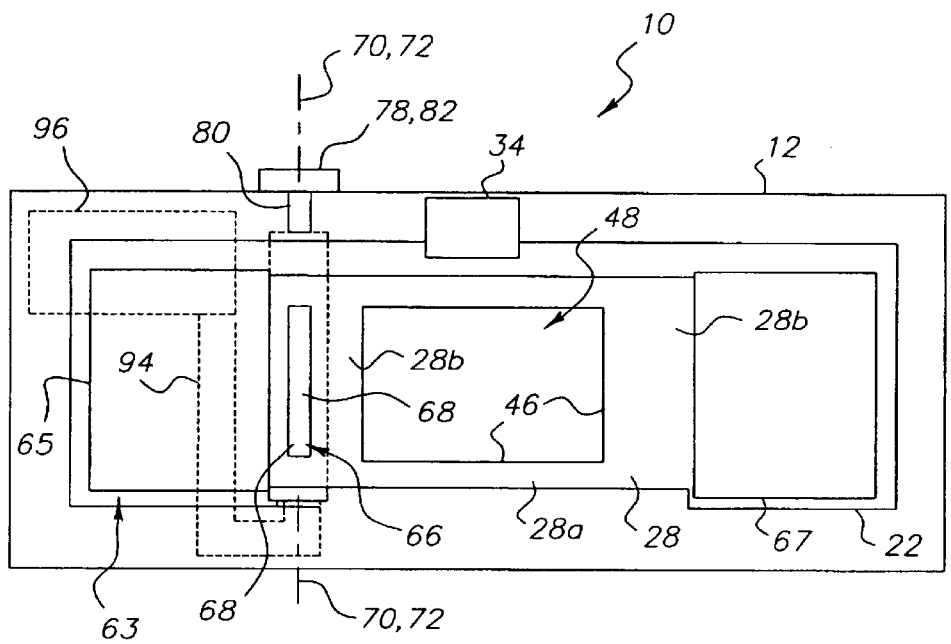
FIG. 1 is a semi-diagrammatical rear view of an embodiment of the camera. For clarity, the back of the camera is not shown, and some other features are shown in simplified form. The reflector of the flash unit and a light pipe are indicated by dashed lines. Covered portions of the mask core are also indicated by dashed lines. Some dimensions in this and other figures are exaggerated for clarity.

Tables 1–2 illustrate two different mask core layouts that can be used to provide an encodement pattern 74 having numeric values. Each layout is based is for a mask core 68 that is movable to sixteen different positions. FIG. 1 is a based 2 code. Each "X" indicates an exposed dot or other mark. Blank spaces in the table indicate unexposed areas. Table 2 is a base 4 code that uses four different colors. The latter approach has an additional benefit that a light transmitting portion 100 of the mask core 68 is included in the segments 101 for all positions of the mask core 68. As a result, an encodement pattern 74 is encoded at every film frame 42. This eliminates the ambiguity presented by the absence of an encodement indicating either a particular encodement value or an error condition. Other alternative codes can be used, such as Gray code.

The different codes provided by the mask can be used to provide modifications at photofinishing. For example, modifications can be provided to change the number of prints to a selected number. A code can provide a change in the image such as to black-and-white or sepia. A code can also provide a change in print format. For example, a print can be changed from a normal format to pseudo-panoramic or pseudo-zoom.

Figure 9:
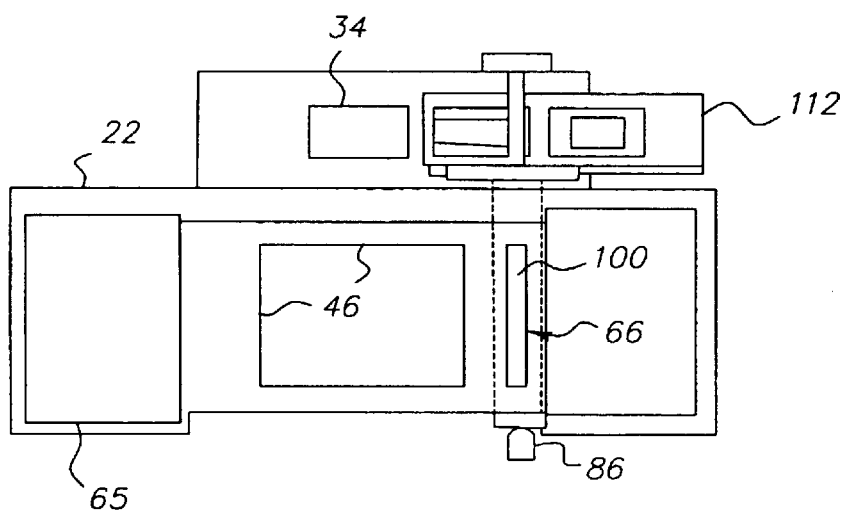
FIGS. 9–11 are semi-diagrammatical rear views of another embodiment of the camera showing the mask core and viewfinder masks in different positions.
Figure 10:
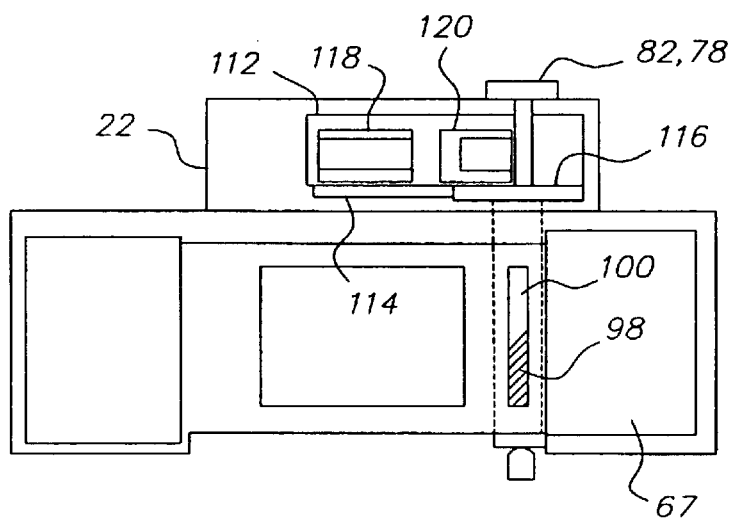
Figure 11:
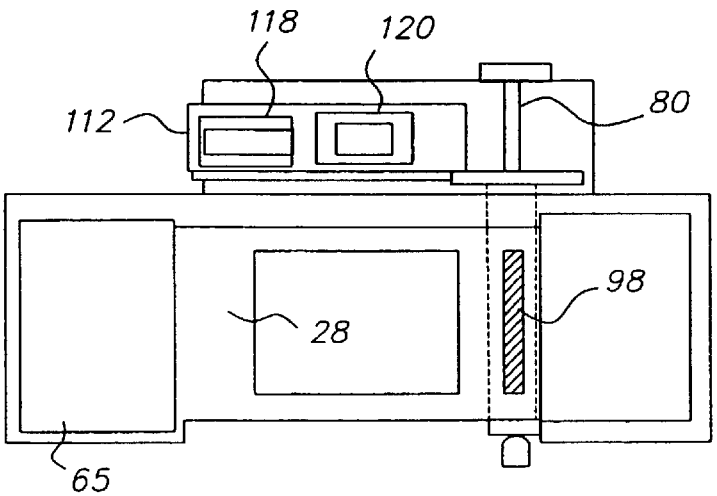

In this case, the camera 10 can have a viewfinder mask 112 that is moved in tandem with the mask core. FIGS. 9–11 illustrate an example of such a viewfinder mask 112. The mask 112 has two positions and rotates around the taking lens 24. The mask 112 is driven by the mask drive 78. In the camera shown in FIGS. 9–11, the mask has a rack or friction surface 114 that is driven by a train 116 of one or more gears or friction wheels, respectively. The train 116 has a gear or friction wheel mounted to shaft 80.

The viewfinder mask 112 has reticles or opaque regions 118,120 defining a pseudo-panoramic format and a pseudo-telephoto format, respectively. The mask 112 is spaced from the viewfinder for third format.

In the embodiment of FIGS. 13–17, the viewfinder mask 112 is driven by a train 132 that is mechanically coupled to the mask core 68. One gear or friction wheel 132a of the mask gear train 132 is external to the front cover 18 and directly engages the mask 112. The mask 112 has a large circular opening 140 that rotates against an extended cowl 142 that encircles the taking lens 24. A forward panel 136 has one opening 144 matched to the mask opening 140 and a second opening 146 matched to the viewfinder 36. The viewfinder 36 and forward panel opening 146 show an "HDTV" print format viewfinder image. The mask 112 has two masking ports 148,150, which mask the viewfinder down to a normal ratio (2:3) and a pseudo-panoramic print format, respectively. (These formats match those available in some Advanced Photo System™ cameras.) The mask 112 is rotated between the three positions. Stops 152 prevent overtravel of the mask 112.

Detents can be provided to bias the viewfinder mask 112 and mask core 68. For example, an over-center mechanism (not shown) can be connected to bias toward specific positions and against intermediate positions. An alternative to an over-center mechanism is a series of positional detents for the mask settings. This is illustrated in FIGS. 13–17. In this case, a handle 138 of the mask 112 extends through a slot 130 in the forward panel 136. The slot 130 is arcuate and has teeth defining different positions of the mask 112. Internal biasing in the handle 138 discourages inadvertent movement of the handle 138 out of each of the mask positions defined by the teeth. The mask positions are coordinated with respective positions of the mask core so the user can see an indication of expected digital modification of captured images. Detents can also be provided for a mask core 68 that does not have a connected viewfinder mask 112.

Figure 19:
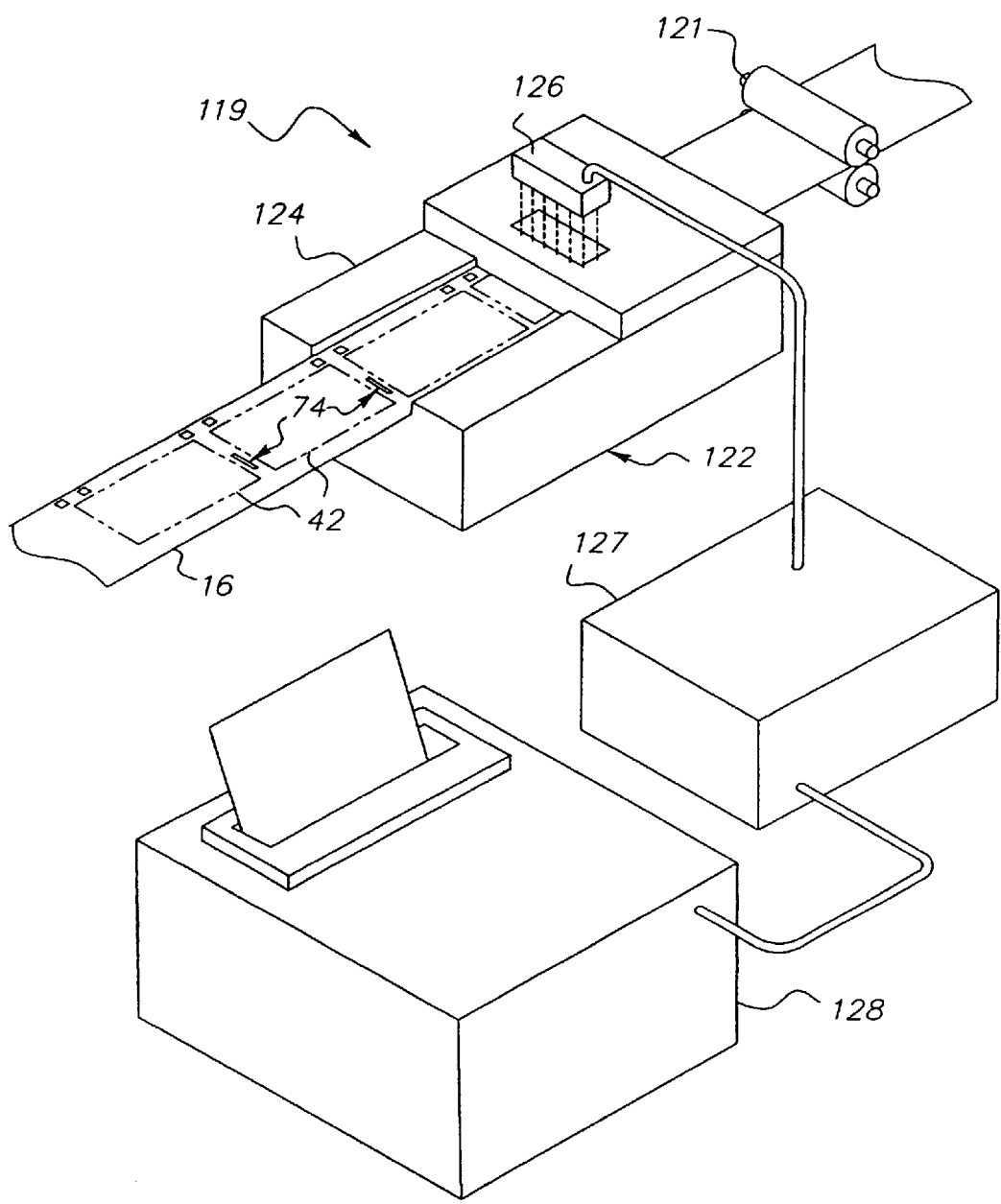
FIG. 19 is a semi-diagrammatical perspective view of a photofinishing unit capable of reading the encodement patterns on filmstrips exposed in the cameras.
Figure 20:
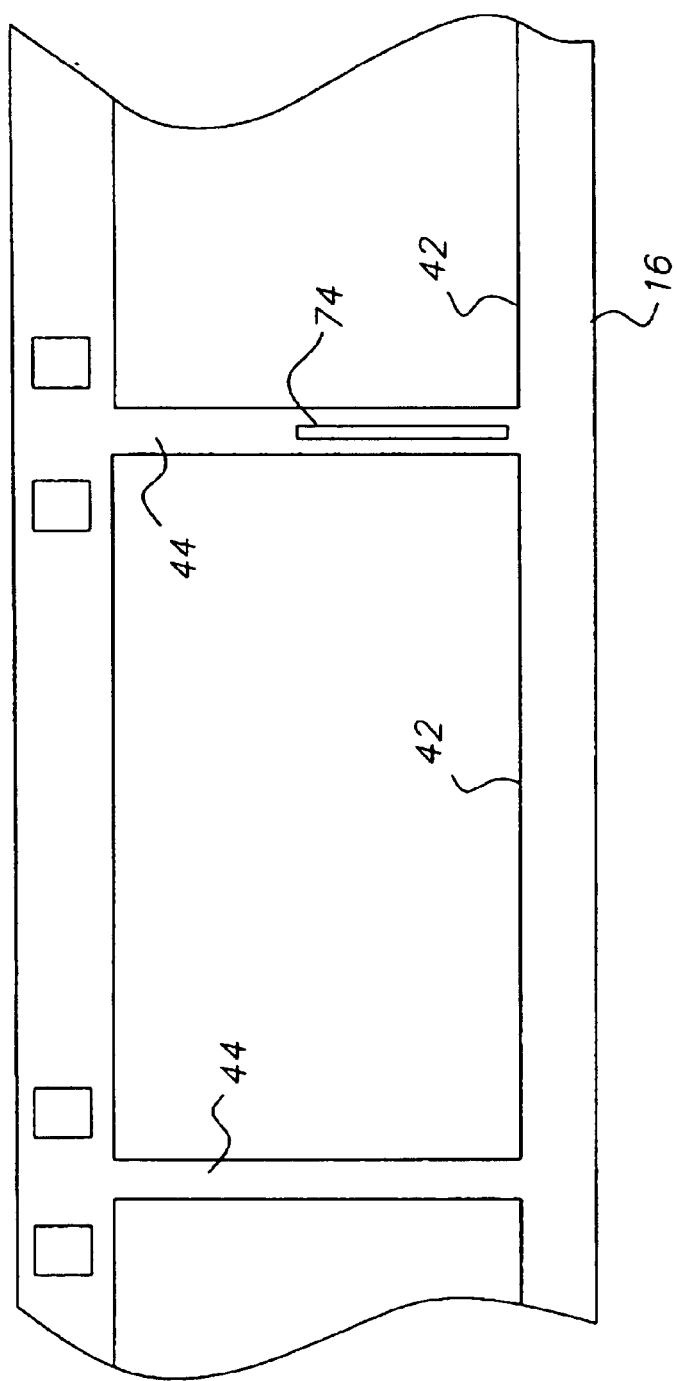
FIG. 20 is a semi-diagrammatical rear view of a portion of the filmstrip showing film frames, interspaces, and an encodement pattern.

FIG. 19 schematically depicts a photofinishing unit 119 that makes prints or other final images from archival images recorded in successive film frames 42 of the filmstrip 16. Not depicted is a chemical processor that is used to develop the latent images on the filmstrip 16. The photofinishing unit 119 can be like that disclosed in U.S. Pat. No. 5,767,945, issued Jun. 16, 1998. A motorized film drive 121 advances the filmstrip 16 from a film supply reel (not shown), through a digital scanner 122 and onto a film take-up reel (not shown).

Filmstrips 16 from many film units can be spliced together into a continuous web on the film supply reel. The scanner 122 has an illuminator 124 that directs light through the film frame 42 and encodement pattern 74 to a scanner head 126. The scanner head 126 has an image sensor such as a charge-coupled device (CCD). The resultant analog electronic image provided by the image sensor is converted into digital form and amplified as necessary by an analog to digital ("A/D") converter (not shown) and sent to a control unit 127.

The control unit 127 is a programmable computer or the like, which provides conventional digital image processing of the electronic images. The control unit checks the detected encodement patterns 74 against a predetermined list of encodement patterns 74 and corresponding digital modifications using a look-up table or the like stored locally or remotely in memory. Respective digital modification are applied to the electronic images and the resulting modified images is output to an output device, such as a printer 128.

The control unit can be part of a general-purpose computer system or can be a dedicated part of photofinishing equipment. In the latter case, the central processing unit can be part of a control system sometimes referred to as an image data manager (IDM). The computer system or IDM includes memory and can include a display and user controls allowing for supervision and intervention by an operator.

The camera 10 is generally described herein in relation to simplified embodiments. Similar considerations apply to other embodiments. For example, the camera 10 can include a real image viewfinder 34 rather than providing masks to show particular effects. The camera 10 can also include a digital display and/or digital viewfinder 34 that he can show particular effects. The encodement patterns 74 have been described in relation to individual film frames 42. Encodement patterns 74 can record information pertaining to an entire film unit 50, such as an identification number and user information. Encodement patterns 74 can also be positioned independent of film frames 42, for example, on a leader or trailer of a film unit 50. The mask core 68 has been described in relation to rotational motion. The mask core 68 can additionally or alternatively be moved in a longitudinal direction along the passageway 64 relative to the window 66. Multiple mask cores 68 can be provided in a camera 10 and the use of a mask core can be combined with other encodement methods.

The invention has been described in detail with particular reference to certain preferred embodiments thereof, but it will be understood that variations and modifications can be effected within the spirit and scope of the invention.

What is claimed is:

1. A camera comprising:
    a body having an exposure frame surrounding an exposure opening, said exposure frame having a window;
    a mask core mounted in said body, said mask core having an axis of rotation extending transverse to said exposure frame, said mask core having a plurality of sectors arranged about said axis of rotation, each said sector having an active position adjoining said window, each said sector shading said window differently in the respective said active position;
    a drive coupled to said mask core, said drive selectively rotating said mask core between said active positions of each of said sectors.

2. The camera of claim 1 wherein said window is lateral to said exposure opening.

3. The camera of claim 1 wherein said window is divided into a series of spaced apart holes.

4. The camera of claim 3 wherein said holes are non-uniformly positioned across said exposure frame.

5. The camera of claim 1 wherein said mask core has a pair of opposed ends and said window adjoins said exposure opening and is spaced from said ends.

6. The camera of claim 5 further comprising a lamp adjoining one of said ends.

7. The camera of claim 1 wherein said mask core includes a light transmissive support and a light modifying layer joined to said support.

8. The camera of claim 1 further comprising a viewfinder aligned with said exposure frame and a viewfinder mask movable by said drive in tandem with said mask core, between a plurality of positions relative to said viewfinder.

9. The camera of claim 1 wherein said mask core has one or more light shading portions, each said shading portion being attenuative of transmitted light.

10. The camera of claim 9 wherein said mask core has one or more light transmitting portions, each said transmitting portion being at least partially light transmissive.

11. The camera of claim 10 wherein at least part of at least one of said light shading and light transmissive portions is a color filter.

12. The camera of claim 10 wherein at least part of each of said light shading and light transmissive portions is a color filter.

13. The camera of claim 10 wherein said light shading and light transmitting portions are aligned, in an axial direction, with said window and one or both of said light shading and light transmitting portions are divided into differently configured sectors about said axis of rotation.

14. The camera of claim 10 wherein said light shading and light transmitting portions are disposed in an arrangement defining numeric values in a mathematical base higher than two.

15. The camera of claim 1 further comprising a taking lens directing light to said exposure frame, and wherein said mask core is disposed between said taking lens and said exposure frame.

16. A camera comprising:
    a shell;
    a taking lens disposed in said shell;
    a camera-frame disposed in said shell, said camera-frame having an exposure frame disposed to receive light from said taking lens, said exposure frame surrounding an exposure opening, said exposure frame having a window laterally adjoining said exposure opening, said camera-frame having a passageway extending transverse to said exposure frame;
    a mask core mounted in said passageway, said mask core being rotatable about an axis of rotation extending along said passageway, said mask core having a plurality of light shading portions, each said shading portion being attenuative of transmitted light, said mask core having a plurality of light transmitting portions, each said transmitting portion being at least partially light transmissive, said mask core having a plurality of sectors, said portions having a different configuration in each of said sectors;
    a drive coupled to said mask core, said drive selectively rotating said mask core to align each of said sectors with said window, in alternation.

17. The camera of claim 16 further comprising a baffle directing light from said taking lens to said mask core.

18. A method for encoding information on photographic film comprising the steps of:
    transmitting a light image through an exposure opening surrounded by an exposure frame to a filmstrip held by said exposure frame;
    during said transmitting, directing light through a passageway that extends transverse to an exposure frame holding a filmstrip;
    propagating said light through a window in said exposure frame to said filmstrip, said window being spaced from said exposure opening;
    during said directing, modulating said light to encode a pattern on said filmstrip.

19. The method of claim 18 wherein said directing further comprises, admitting light into a cylindrical mask core disposed in said passageway.

20. The method of claim 19 wherein said admitting of said light is into one of two opposed longitudinal ends of said mask core.

21. The method of claim 18 wherein said modulating further comprises filtering part of said light.

22. A camera comprising:
    a body having an exposure frame surrounding an exposure opening, said exposure frame having a window;
    a mask core mounted in said body, said mask core having an axis of rotation extending transverse to said exposure frame, said mask core having a plurality of sectors arranged about said axis of rotation, each said sector having an active position adjoining said window, each said sector shading said window differently in the respective said active position;
    a drive coupled to said mask core, said drive selectively rotating said mask core between said active positions of each of said sectors;
    wherein said window is divided into a series of spaced apart holes.

23. The camera of claim 22 wherein said holes are non-uniformly positioned across said exposure frame.

24. A camera comprising:

a shell;

a taking lens disposed in said shell;

a camera-frame disposed in said shell, said camera-frame having an exposure frame disposed to receive light from said taking lens, said exposure frame surrounding an exposure opening, said exposure frame having a window laterally adjoining said exposure opening, said camera-frame having a passageway extending transverse to said exposure frame;

a mask core mounted in said passageway, said mask core being rotatable about an axis of rotation extending along said passageway, said mask core having a plurality of light shading portions, each said shading portion being attenuative of transmitted light, said mask core having a plurality of light transmitting portions, each said transmitting portion being at least partially light transmissive, said mask core having a plurality of sectors, said portions having a different configuration in each of said sectors;

a drive coupled to said mask core, said drive selectively rotating said mask core to align each of said sectors with said window, in alternation; and a baffle directing light from said taking lens to said mask core.

25. A method for encoding information on photographic film comprising the steps of:

directing light through a passageway that extends transverse to an exposure frame holding a filmstrip;

propagating said light through a window in said exposure frame to said filmstrip, said window being spaced from said exposure opening;

during said directing, modulating said light to encode a pattern on said filmstrip; and concurrent with said directing, propagating, and modulating, capturing an image on a film frame of said filmstrip in non-overlapping relation to said pattern.

26. The method of claim 25 wherein said admitting of said light is into one of two opposed longitudinal ends of a mask core disposed in said passageway, said window is between said ends, and said propagating is from said mask core and then through said window.

* * * * *